United States Patent [19]

Hisamoto et al.

[11] Patent Number: 4,976,741

[45] Date of Patent: Dec. 11, 1990

[54] ANTISTATIC AGENT: MIXTURE OF ANIONIC SURFACTANT AND A FLUORINE-CONTAINING NONIONIC SURFACTANT

[75] Inventors: Iwao Hisamoto; Masaru Hirai; Sueyoshi Ishikawa, all of Osaka, Japan

[73] Assignee: Daikin Industries Ltd., Osaka, Japan

[21] Appl. No.: 873,492

[22] Filed: Jun. 12, 1986

[30] Foreign Application Priority Data

Jun. 13, 1985 [JP] Japan .................................. 60-128847

[51] Int. Cl.$^5$ ................................................ C08K 5/00
[52] U.S. Cl. .................................... 8/115.6; 8/115.51; 8/115.64; 8/115.65; 252/8.6; 252/8.75; 252/8.8; 252/8.9

[58] Field of Search ............... 8/115.6, 115.64, 115.65; 252/8.6, 8.75, 8.9

[56] References Cited

FOREIGN PATENT DOCUMENTS 57-042741 3/1982 Japan .
59-074554 4/1984 Japan .

*Primary Examiner*—A. Lionel Clingman
*Attorney, Agent, or Firm*—Birch, Stewart, Kolasch & Birch

[57] ABSTRACT

An antistatic agent comprising a fluorine-containing anionic surfactant and a nonionic surfactant in a weight ratio of 95:5 to 5:95 or an anionic surfactant and a fluorine-containing surfactant in a weight ratio of 95:5 to 5:95, which, even in a small amount, can impart an antistatic effect to a substrate.

6 Claims, No Drawings

ANTISTATIC AGENT: MIXTURE OF ANIONIC SURFACTANT AND A FLUORINE-CONTAINING NONIONIC SURFACTANT

FIELD OF THE INVENTION

The present invention relates to an antistatic agent. More particularly, it relates to an antistatic agent comprising a fluorine-containing anionic and/or nonionic surfactant or an anionic surfactant and a fluorine-containing nonionic surfactant.

BACKGROUND OF THE INVENTION

A material with poor electrical conductivity such as a resinous material is easily electrostatically charged. Static electricity may cause an attraction of dust, electric shock, ignition, blocking of the materials and so on.

To remove or decrease static electricity charged on the material, an antistatic agent is used. Examples of antistatic agent used, are one or more hydrocarbon type surfactants or one or more fluorine-containing surfactants (cf. Japanese Patent Kokai Publication (unexamined) No. 42741/1982). A conventional antistatic agent does not exert sufficient effect unless it is used in a large amount. However, a large amount of the antistatic agent present renders a surface of a resinous material to be sticky or impairs the transparency of the resinous material.

SUMMARY OF THE INVENTION

One object of the present invention is to provide a novel antistatic agent comprising a fluorine-containing surfactant, which, even when used in a small amount can exert antistatic effect.

This and other objects are accomplished by an antistatic agent comprising a fluorine-containing anionic surfactant and a nonionic surfactant in a weight ratio of 95:5 to 5:95 or an anionic surfactant and a fluorine-containing nonionic surfactant in a weight ratio of 95:5 to 5:95.

DETAILED DESCRIPTION OF THE INVENTION

The fluorine-containing surfactant may be a conventional one. Preferably, it contains 10 to 70% by weight of fluorine.

Preferably, the fluorine-containing surfactant is a compound of the formula:

$$R_f-Q^1-SO_3M \quad (I)$$

wherein $R_f$ is a $C_3-C_{21}$ fluoroalkyl group which optionally contain one or two oxygen atom in a backbone chain: $Q^1$ is $-(CH_2)_k-$, $-(CH_2)_k-O-$, $-SO_2N(R^1)-(CH_2)_k-$, $-CH_2CH(OR^2)CH_2-$, $-(CH_2)_k-Ph-$ or $-(CH_2CH_2O)_m-$ wherein k is an integer of 1 to 10, $R^1$ is a hydrogen atom or a $C_1-C_5$ alkyl group, $R^2$ is a hydrogen atom or a $C_2-C_8$ acyl group, Ph is a phenylene group and m is an integer of 1 to 20: and M is an alkali metal, an ammonium group or a diethanolamino group, $$R_f-Q^1-COOM \quad (II)$$

wherein $R_f$, $Q^1$ and M are the same as defined above, or $$(R_f-Q^1)_{3-n}-P(=O)(OM)_n \quad (III)$$

wherein $R_f$, $Q^1$ and M are the same as defined above, and n is 1 or 2. These compounds may be used alone or as a mixture. In the above formulae, the number of the alkyleneoxy groups has a distribution.

Specific examples of the fluorine-containing anionic surfactant are $$CF_3CF_2(CF_2CF_2)_4SO_3K, \quad (1)$$

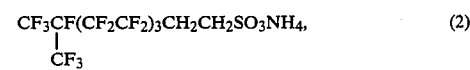  (2)

$$CF_3CF_2(CF_2CF_2)_5SO_2N(CH_3)CH_2COOH, \quad (3)$$
$$H(CF_2CF_2)_3COONH_4, \quad (4)$$
$$CF_3CF_2(CF_2CF_2)_2CH_2CH(OH)CH_2N(CH_3)CH_2COOK, \quad (5)$$
$$CF_3CF_2(CF_2CF_2)_2CH_2CH_2OP(=O)(ONH_4)_2, \quad (6)$$
$$(CF_3CF_2CF_2CF_2CH_2CH_2O)_2P(=O)OH, \quad (7)$$

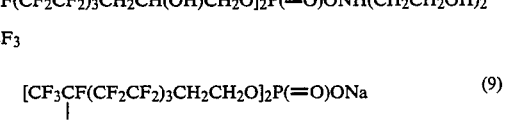  (8)

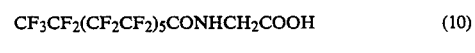  (9)

$$CF_3CF_2(CF_2CF_2)_5CONHCH_2COOH \quad (10)$$

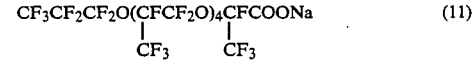  (11)

The fluorine-containing nonionic surfactant may be a conventional one. Preferably, it contains 10 to 70% by weight of fluorine.

Preferably, the fluorine-containing nonionic surfactant is a compound of the formula:

$$R_f-A-(CHR^3-CH_2-O)_p-(CHR^4-CH_2-O)_q-(CHR^5-CH_2-O)_r-B \quad (IV)$$

wherein $R_f$ is the same as defined above: A is $-CH_2CH(OR^2)-CH_2-$, $-SO_2N(R^1)-(CH_2)_k-$, $-(CH_2)_k-COO-$, $-(CH_2)_k-OCO-$, $-N(R^1)-(CH_2)_k-$, $-(CH_2)_k-$, $-SO_2N(R^1)(CH_2)_{k+1}-OCO-$, $-(CH_2)_kSCO-$ or $-(CH_2)_k-S-(CH_2)_k-$ wherein $R^1$, $R^2$ and k are the same as defined above: B is a hydrogen atom, a $C_1-C_{18}$ aliphatic group, a $C_2-C_{18}$ acyl group, a phenyl group which is optionally substituted by at least one $C_1-C_{10}$ alkyl group: $R^3$, $R^4$ and $R^5$ are the same or different and each a hydrogen atom or a methyl group: p is an integer of 1 to 40: and q and r are the same or different and each an integer of 0 to 40, a polymer comprising repeating units derived from a compound of the formula:

$$R_f-A-(CHR^3CH_2-O)_p-(CHR^4-CH_2-O)_q-(CHR^5-CH_2-O)_r-A-CR^6=CH_2 \quad (V)$$

wherein $R_f$, A, $R^3$, $R^4$, $R^5$, p, q and r are the same as defined above, and $R^6$ is a hydrogen atom or a methyl group, or a copolymer comprising repeating units derived from a compound of the formula:

$$R_f-A-CR^6=CH_2 \quad (VI)$$

wherein $R_f$, A and $R^6$ are the same as defined above and a compound of the formula:

$$CH_2=CR^6-A-(CHR^3-CH_2-O)_p-(CHR^4-CH_2-O)_q-(CHR^5-CH_2-O)_r-B \quad (VII)$$

wherein A, B, $R^3$, $R^4$, $R^5$, $R^6$, p, q and r are the same as defined above.

These polymers may be prepared by a conventional polymerization method such as solution, emulsion or bulk polymerization (cf. Japanese Patent Kokai Publication (unexamined) Nos. 134786/1978 and 204144/1984).

These compounds may be used alone or as a mixture. In the above formulas, the number of the alkyleneoxy groups has a distribution.

Specific examples of the fluorine-containing nonionic surfactant are $$CF_3CF(CF_2CF_2)_3CH_2CH(OH)CH_2O(CH_2CH_2O)_9CH_3, \quad (12)$$
$$|$$
$$CF_3$$

$$CF_3CF_2(CF_2CF_2)_5CH_2CH(OH)CH_2O(CH_2CH_2O)_{15}COC_7H_{15}, \quad (13)$$

$$CF_3CF_2(CF_2CF_2)_3CH_2CH(OH)CH_2O(CH_2CH_2O)_5H, \quad (14)$$

$$CF_3CF(CF_2CF_2)_6CH_2CH(OH)CH_2O(CH_2CH_2O)_9H, \quad (15)$$
$$|$$
$$CF_3$$

$$\quad\quad\quad\quad\quad OCOCH_3\ CH_3 \quad (16)$$
$$\quad\quad\quad\quad\quad |\quad\quad\quad |$$
$$CF_3CF_2(CF_2CF_2)_3CH_2CHCH_2O(CHCH_2O)_5(CH_2CH_2O)_{10}CH_3,$$

$$H(CF_2CF_2)_3CH_2COO(CH_2CH_2O)_{30}-\text{---}C_8H_{17}, \quad (17)$$

$$CF_3CF_2(CF_2CF_2)_3CONCH_2CH_2O(CH_2CH_2O)_{15}H, \quad (18)$$
$$\quad\quad\quad\quad\quad\quad\quad |$$
$$\quad\quad\quad\quad\quad\quad\quad C_3H_7$$

$$CF_3CF_2(CF_2CF_2)_2SO_2NCH_2CH_2O(CH_2CH_2O)_8H, \quad (19)$$
$$\quad\quad\quad\quad\quad\quad\quad |$$
$$\quad\quad\quad\quad\quad\quad\quad C_3H_7$$

$$CF_3 \quad\quad\quad\quad\quad\quad\quad\quad\quad\quad\quad\quad\quad (20)$$
$$|$$
$$CF_3CF(CF_2CF_2)_3CH_2CH(OH)CH_2O(CH_2CH_2O)_{20}\text{--}\langle\bigcirc\rangle\text{--}C_9H_{19},$$

$$C_3F_7O(C_3F_6O)_3CFCOO(CH_2CH_2O)_5H, \quad (21)$$
$$\quad\quad\quad\quad\quad |$$
$$\quad\quad\quad\quad\quad CF_3$$

a copolymer of (22)
$$CF_3CF(CF_2CF_2)_6CH_2CH(OH)CH_2O(CH_2CH_2O)_8COC=CH_2$$
$$|\quad\quad\quad\quad\quad\quad\quad\quad\quad\quad\quad\quad\quad\quad\quad\quad\quad\quad |$$
$$CF_3 \quad\quad\quad\quad\quad\quad\quad\quad\quad\quad\quad\quad\quad\quad\quad CH_3$$

and $$HO(CH_2CH_2O)_8COC=CH_2 \text{ (molar ratio of 1:2)}$$
$$\quad\quad\quad\quad |$$
$$\quad\quad\quad\quad CH_3$$

a copolymer of (23)
$$CF_3CF_2(CF_2CF_2)_2CH_2CH_2OCOCH=CH_2 \text{ and}$$

$$HO(CH_2CH_2O)_{10}(CHCH_2O)_{20}(CH_2CH_2O)_{10}COCH=CH_2$$
$$\quad\quad\quad\quad\quad\quad |$$
$$\quad\quad\quad\quad\quad\quad CH_3$$
(molar ratio of 1:1)

A commercially available fluorine-containing nonionic surfactant is also used according to the present invention and includes Fluorad FC-430 (manufactured by 3M), Surflon AG-381 and AG-382 (manufactured by AsahiGlass Co., Ltd.), Megafac F-142D and F-170 (manufactured by Dainippon Ink and Chemicals Inc.) and the like.

The anionic compound may also be any one of conventional carboxylate type, sulfonate type, sulfuric acid ester salt type and phosphoric acid ester salt type anionic surfactants containing no fluorine.

Specific examples of the anionic surfactant are pentaalkyl tripolyphosphate, hexaalkyl tetrapolyphosphate, alkyl allylphosphonate, diallyl-2-cyanoethyl phosphonate polymer, dimethylvinyl phosphonate polymer, polyoxyethylene alkyl ether phosphate and its salt, alkyl sulfonate, alkyl carboxylate, polyoxyethylene alkyl ether acetate, alkyl sulfosuccinate, N-acylamino acid and its salt, N-acylmethyl taurate and the like.

The nonionic surfactant may be any one of conventional ether type, ether ester type, ester type and nitrogen-containing type nonionic surfactants containing no fluorine.

Specific examples of the nonionic surfactants are glycerol tri(hydroxypolyalkoxyalkylate), 2-hydroxyalkyl-2hydroxyethylamine, hydroxyalkylpolyoxyalkylenedialkylamine, alkyldi(hydroxypolyethyleneoxyethyl)amine, N,N-di(hydroxypolyalkyleneoxyalkyl)alkamide, alkylenedi(alkamide), N-hydroxypolyethoxythylpolyamide, alkylpolyoxyalkyleneurethane, alkylpolyoxyalkylene-N,N-dialkylurethane, polyoxyethylenedi(alkylurethane), N-alkyl-N-hydroxypolyethoxyethylhydantoin, phosphite ester, sorbitane ethyleneoxide adduct, N,N-dialkylpolyphophoric acid amide, polyglycidyl ether, N,N'-tetra(hydroxypolyalkoxyalkyl)alkylenediamine, N-alkyl-N,N-tri(hydroxypolyalkoxyalkyl)alkylenediamine. di(hydroxypolyethoxyethyl)aminoalkylketimine, N-hydroxypolyalkoxyalkyllactam and the like.

In the antistatic agent, the anionic surfactant and the nonionic surfactant should be contained in a weight ratio of 95:5 to 5:95 irrespective of whether either one is a fluorine-containing surfactant. Preferably, the weight ratio of the anionic surfactant and the nonionic surfactant is 10:90 to 90:10, more preferably 15:85 to 85:15. When the surfactants are used in a weight ratio outside the above range, synergistic effect is not achieved. A specific weight ratio of the surfactants depends on the type of substrate on which the antistatic agent is applied, compatibility of the substrate and the antistatic agent of the invention, the molding temperature of the substrate, interaction with other additives, degree of antistaticity to be achieved, etc.

The antistatic agent of the invention may be used in the same manner as a conventional antistatic agent. For example, the antistatic agent as such is applied on a substrate or diluted with a suitable solvent and applied on a substrate, for instance, by brush coating or spray coating. Further, a substrate could be dipped in the antistatic agent as such or dipped in its solution, to apply the agent on the substrate. Alternatively, the antistatic agent may be added to a material of the substrate and kneaded when the substrate is subsequently molded. A suitable solvent is one which is volatile, such as water, alcohol, chlorofluorohydrocarbons and the like. The antistatic agent of the present invention, cannot be completely soluble in the solvent, but can be dispersed or suspended in it. When the antistatic agent of the invention is diluted with the solvent, 0.005 to 2 parts by weight, preferably 0.01 to 1.5 part by weight of the agent is used per 100 parts of the solvent.

When the antistatic agent of the invention is added to the raw material of a substrate during molding, 0.01 to 5 parts by weight, preferably 0.02 to 2 parts by weight of the agent is kneaded with 100 parts by weight of the material. When the amount of the agent is less than 0.01 parts by weight, an antistatic effect is not exerted. When it is more than 5 part, the antistatic effect is not significantly improved in proportion to the increased amount.

The antistatic agent of the invention may contain other surfactant and/or additives, such as those which are customarily added to conventional antistatic agents. Such additives includes polyglycol (e.g. polyethylene glycol), oleyl alcohol, methylhexanol and the like.

The antistatic agent of the present is preferably applied on or added to film or molded articles, coatings or fibers made of resins (e.g. polyethylene resin, polystyrene resin, polyester resin, ABS resin, vinyl chloride resin and the like).

The present invention will be explained by the following examples, in which parts are by weight unless otherwise indicated.

Agents" (page 136) published by SAIWAI SHOBO in 1968). The results are shown in Table 3. The smaller the surface resistivity, the better the antistatic effect of the agent.

EXAMPLES 7 AND 8 AND COMPARATIVE EXAMPLES 7 AND 8

Surfactants shown in Table 1 or 2 in amounts of Table 3 were added to 100 parts of polyethylene (Sunteck-LD, L-1850A manufactured by Asahi Chemical Co., Ltd.) and kneaded by means of a kneader at 20° C. for 150 minutes. Then, the compound was hot pressed at 150° C. under pressure of 5 kg/cm$^2$ to obtain a sample piece (10 cm×10 cm×0.2 cm). The surface resistivity of the sample was measured and calculated in the same manner as above. The results are shown in Table 3.

TABLE 1

Fluorine-containing anionic surfactant a  $CF_3CF(CF_2CF_2)_2CH_2CH_2SO_3NH_4$
   $\quad |$
   $\quad CF_3$ b  $H(CF_2CF_2)_3COONH_4$
c  $[CF_3CF_2(CF_2CF_2)_3CH_2CH_2O]_2P(=O)OH$ Fluorine-containing nonionic surfactant d  $CF_3CF(CF_2CF_2)_3CH_2CH(OH)CH_2O(CH_2CH_2O)_9H$
   $\quad |$
   $\quad CF_3$ e  $CF_3CF_2(CF_2CF_2)_4CH_2CH(OH)CH_2O(CH_2CH_2O)_{20}\text{-}\langle C_6H_4 \rangle\text{-}C_9H_{19}$ f  A copolymer of $CF_3CF(CF_2CF_2)_4CH_2CH(OH)CH_2O(CH_2CH_2O)_8COC=CH_2$
   $\quad |\qquad\qquad\qquad\qquad\qquad\qquad\qquad\qquad\quad\;\; |$
   $\quad CF_3\qquad\qquad\qquad\qquad\qquad\qquad\qquad\qquad CH_3$ and $HO(CH_2CH_2O)_8COC=CH_2$ (molar ratio of 1:2)
   $\qquad\qquad\qquad\;\; |$
   $\qquad\qquad\qquad\;\; CH_3$ (cf. Japanese Pat. Kokai Publn. No. 204144/1984)

EXAMPLES 1–6 AND COMPARATIVE EXAMPLES 1–6

Surfactants shown in Table 1 or 2 in amounts shown in Table 3 were added to 100 parts of trichlorotrifluoroethane and thoroughly mixed. In the mixture, a plate of ABS resin (10 cm×10 cm×0.1 cm) was dipped for one minutes. Then the plate was removed from the mixture and dried at 25° C., 50% RH for 24 hours. A surface resistance of the plate was measured as follows:

A pair of concentric circular electrodes were formed on one surface of the plate by means of a conductive adhesive tape (Cu-7635D distributed by Sony Chemical Co., Ltd.). A round center electrode had a diameter of 5 cm, and an outer electrode had an outer diameters of 8 cm and an inner diameter of 7 cm. The opposite surface having no electrode was covered with the same conductive adhesive tape for grounding. Resistance between the electrodes was measured by means of an ultra-insulating resistance/microcurrent meter (TR-8601-TR-42 manufactured by Takeda Riken Co., Ltd.). From the measured resistance, surface resistivity was calculated by a conventional manner (cf. "Antistatic

TABLE 2

Anionic surfactant g  $C_{12}H_{25}O(CH_2CH_2O)_5CH_2COONa$ h  $\quad\quad\quad C_2H_5$
   $\quad\quad\quad\; |$
   $C_4H_9CHCH_2OCOCH_2$
   $\qquad\qquad\qquad\quad\;\; |$
   $C_4H_9CHCH_2OCOCHSO_3Na$
   $\quad\quad\quad\; |$
   $\quad\quad\quad C_2H_5$ i  $[C_{12}H_{25}O(CH_2CH_2O)_8]_2P(=O)OH$ Nonionic surfactant j  $\quad HOCH\text{—}CHOH$
   $\quad\quad\;\; |\qquad\quad |$
   $\quad\quad CH_2 - CHCH(OH)CH_2OCOC_7H_{15}$
   $\quad\quad\quad\; \backslash\;\; /$
   $\quad\quad\quad\quad O$ k  $C_{17}H_{35}CON[(CH_2CH_2O)_{15}H]_2$
l  $C_{12}H_{25}O(CH_2CH_2O)_9H$

TABLE 3

| | F-containing anionic surfactant (part) | F-containing nonionic surfactant (part) | Anionic surfactant (part) | Nonionic surfactant (part) | Surface resistivity (ohm) |
|---|---|---|---|---|---|
| Example 1 | a (0.1) | — | — | j (0.7) | $4.8 \times 10^8$ |
| Example 2 | b (0.1) | — | — | k (0.9) | $3.5 \times 10^8$ |
| Example 3 | c (0.2) | — | — | l (0.6) | $1.0 \times 10^8$ |
| Example 4 | — | d (0.1) | i (0.4) | — | $2.3 \times 10^8$ |
| Example 5 | — | e (0.2) | h (0.2) | — | $3.3 \times 10^8$ |
| Example 6 | — | f (0.4) | g (0.6) | — | $1.5 \times 10^9$ |
| Example 7 | c (0.2) | — | — | k (0.8) | $3.8 \times 10^{10}$ |
| Example 8 | — | d (0.4) | i (0.6) | — | $4.1 \times 10^{10}$ |
| Com. Ex. 1 | c (1.0) | — | — | — | $4.5 \times 10^{13}$ |
| Com. Ex. 2 | — | d (1.0) | — | — | $3.0 \times 10^{11}$ |
| Com. Ex. 3 | — | — | i (1.0) | — | $2.1 \times 10^{13}$ |
| Com. Ex. 4 | — | — | — | l (1.0) | $1.8 \times 10^{13}$ |
| Com. Ex. 5 | c (0.5) | d (0.5) | — | — | $6.3 \times 10^{11}$ |
| Com. Ex. 6 | — | — | i (0.5) | l (0.5) | $2.7 \times 10^{12}$ |
| Com. Ex. 7 | b (0.5) | f (0.5) | — | — | $1.0 \times 10^{13}$ |
| Com. Ex. 8 | — | — | h (0.5) | j (0.7) | $8.3 \times 10^{13}$ |

What is claimed is:

1. An antistatic agent comprising a non-fluorine-containing anionic surfactant and a fluorine-containing nonionic surfactant in a weight ratio of 95:5 to 5:95, wherein the non-fluorine-containing anionic surfactant is a carboxylate, sulfonate, sulfuric acid ester salt, or phosphoric acid ester salt, and wherein the fluorine-containing nonionic surfactant contains 10 to 70% by weight of fluorine.

2. The antistatic agent of claim 1, wherein the weight ratio is 10:90 to 90:10.

3. The antistatic agent of claim 1, wherein the weight ratio is 15:85 to 85:15.

4. The antistatic agent of claim 1, wherein the fluorine-containing nonionic surfactant is a compound of the formula:

$$R_f-A-(CHR^3-CH_2O)_p-(CHR^4-CH_2-O)_q-(CHR^5-CH_2O)_r-B$$

wherein $R_f$ is a $C_3$-$C_{21}$ fluoroalkyl group which optionally contain one or two oxygen atoms in a backbone chain; A is $-CH_2CH(CR^2)-CH_2-$, $-SO_2N(R^1)-(CH_2)_k-$, $-CO-$, $-CO-N(R^1)-(CH_2)_k-$, $-(CH_2)_k-$ or $-(CH_2)_k-S-(CH_2)_k-$, wherein k is an integer of 1 to 10; $R^1$ is a hydrogen atom or a $C_1$-$C_5$ alkyl group; $R^2$ is a hydrogen atom or a $C_2$-$C_8$ acyl group; B is a hydrogen atom, a $C_1$-$C_{18}$ aliphatic group, a $C_2$-$C_{18}$ acyl group, a phenyl group which is optionally substituted by at least one $C_1$-$C_{10}$ alkyl group; $R^3$, $R^4$ and $R^5$ are the same or different and each a hydrogen atoms or a methyl group; p is an integer of 1 to 40; and q and r are the same or different and each an integer of 0 to 40;

a polymer comprising repeating units derived from a compound of the formula:

$$R_f-A-(CHR^3-CH_2-O)_p-(CHR^4-CH_2-O)_q-(CHR^5-CH_2-O)_r-A-CR^6=CH_2 \quad (V)$$

wherein $R_f$, A, $R^3$, $R^4$, and $R^5$, p, q, and r are the same as defined above, and $R^6$ is a hydrogen atom or a methyl group, or a copolymer comprising repeating units derived from a compound of the formula:

$$R_f-A-CR^6=CH_2 \quad (VI)$$

wherein $R_f$, A and $R^6$ are the same as defined above and a compound of the formula:

$$CH_2=CR^6-A-(CHR^3-CH_2-O)_p-(CHR^4-CH_2-O)_q-(CHR^5-CH_2-O)_r-B \quad (VII)$$

wherein A, B, $R^3$, $R^4$, $R^5$, $R^6$, p, q, and r are the same as defined above.

5. An antistatic agent containing poor electric conductive material, said material comprising a substrate with an antistatic agent having been applied thereon, wherein said substrate is a resin in a form selected from a film, a molded article, a coating or a fiber, and wherein said antistatic agent comprises a non-fluorine-containing anionic surfactant and a fluorine-containing nonionic surfactant in a weight ratio of 95:5 to 5:95, wherein the non-fluorine-containing anionic surfactant is a carboxylate, sulfonate, sulfuric acid ester salt, or phosphoric acid ester salt, and wherein the fluorine-containing nonionic surfactant contains 10 to 70% by weight of fluorine.

6. The antistatic agent containing poor electric conductive material of claim 5, wherein the substrate resin is selected from polyethylene, polystyrene, polyester, ABS or vinyl chloride polymer.

* * * * *